UNITED STATES PATENT OFFICE.

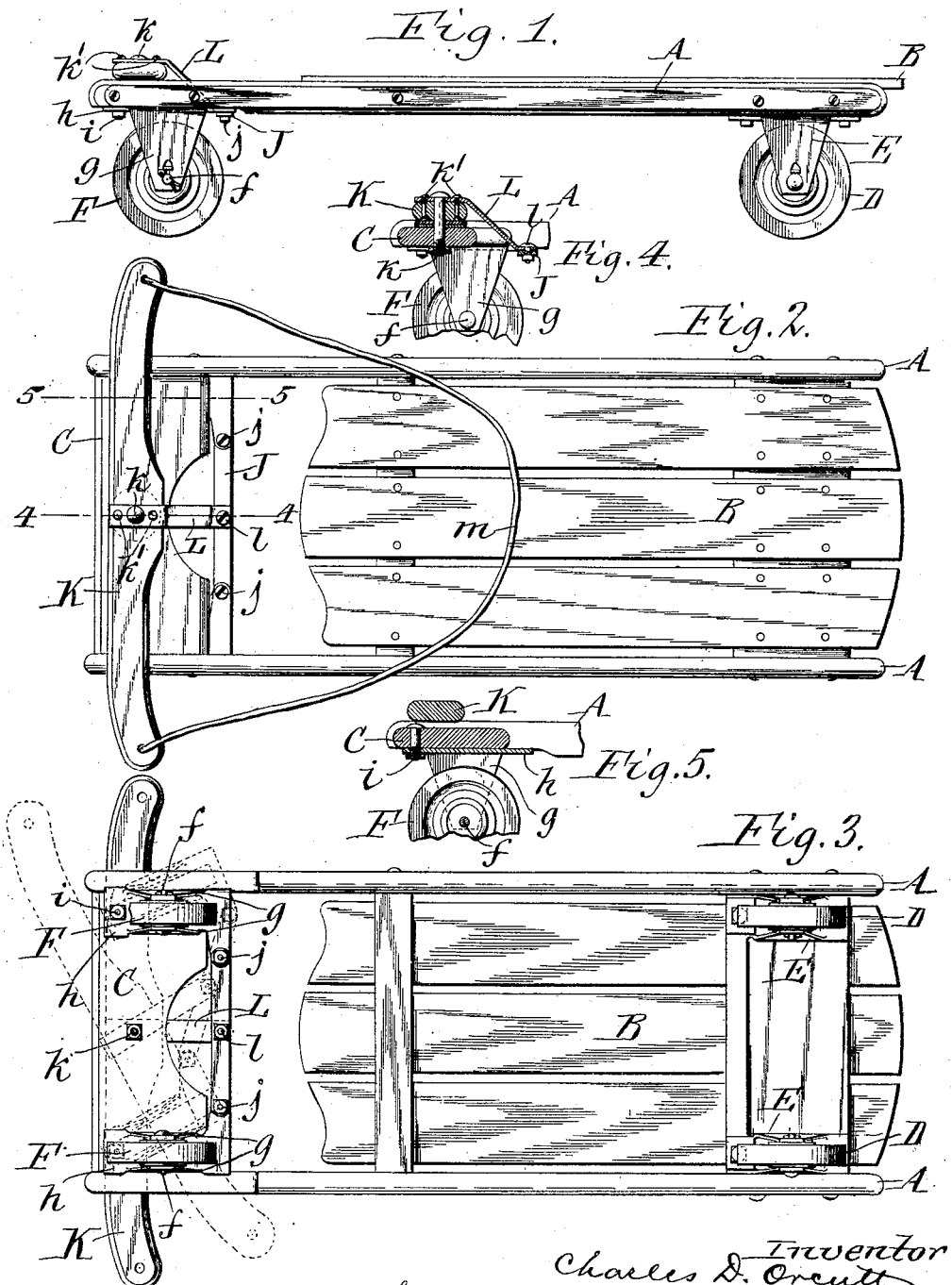

CHARLES D. ORCUTT, OF NORTH TONAWANDA, NEW YORK, ASSIGNOR TO BUFFALO SLED COMPANY, OF BUFFALO, NEW YORK, A CORPORATION OF NEW YORK.

WHEELED COASTER.

967,422.  Specification of Letters Patent.  Patented Aug. 16, 1910.

Application filed February 26, 1909. Serial No. 480,237.

*To all whom it may concern:*

Be it known that I, CHARLES D. ORCUTT, a citizen of the United States, residing at North Tonawanda, in the county of Niagara and State of New York, have invented a new and useful Improvement in Wheeled Coasters, of which the following is a specification.

This invention relates to a wheeled coaster and has the object to provide a steering gear for this class of coasters which is of simple and durable construction and which permits of steering the coaster easily and reliably.

In the accompanying drawings: Figure 1 is a side elevation of a wheeled coaster equipped with my improved steering gear. Fig. 2 is a top plan view thereof. Fig. 3 is a bottom plan view thereof. Figs. 4 and 5 are fragmentary vertical longitudinal sections in the correspondingly numbered lines in Fig. 2.

Similar letters of reference indicate corresponding parts throughout the several views.

The body of the coaster may be of any suitable construction but preferably comprises two longitudinal side bars or rails A, A, a seat B connecting the rear parts of the side bars, and a cross piece or head C connecting the front ends of the side bars. At its rear end the body is preferably supported by two fixed wheels or rollers D, D each of which is pivoted on a yoke E secured to the underside of the rear part of the seat. At its front end the body is supported by two steering wheels F which are arranged underneath opposite ends of the front cross piece. Each of these wheels is connected with the cross piece by means of a yoke which has two upright side pieces or cheeks $g, g$ arranged on opposite sides of a steering wheel F and supporting the axle or pivot pin $f$ thereof, and a head $h$ connecting the upper ends of the side pieces and pivotally connected in front of the axis of the steering wheel with the underside of the body cross piece by means of a vertical bolt, pivot or pin $i$. By thus pivoting the yokes on the body of the coaster the same will always cause the steering wheels to trail from the vertical pivots $i$ and not tend to turn irregularly.

Adjacent to the rear edge of the body cross piece is arranged a transverse connecting bar or rod J which is pivotally connected at opposite ends with the steering wheel yokes in rear of the axes of the steering wheels by means of vertical pins, bolts or rivets $j$. By this means the steering wheels are compelled to turn together and enable the direction of movement of the coaster to be directed and controlled.

Above the body cross piece is arranged a transverse steering bar K which is pivoted centrally on the upper side of the cross piece by a vertical bolt, pin or pivot $k$ so as to turn horizontally. To the middle of this steering bar is secured by the pivot $k$, and by rivets $k^1$, the front end of a longitudinal coupling arm L, the rear end of which is depressed and is pivotally connected by a vertical bolt $l$, or otherwise with the central part of the connecting bar J. Upon turning the steering bar horizontally in one direction or the other, this movement is transmitted by the coupling arm and connecting rod to both yokes, whereby the steering wheels are simultaneously turned in the corresponding direction. The steering bar is preferably of such length that it extends beyond the sides of the coaster body and permits of obtaining a considerable leverage for reliably steering and controlling the direction of movement of the coaster. The steering bar may be operated directly either by the feet or the hands while occupying the seat, or the same may be operated indirectly by means of a cord $m$ connected with the ends of the steering bar, as shown in Fig. 2.

I claim as my invention:

1. A wheeled coaster comprising a body, a rolling support for the rear end of the body, yokes pivoted vertically to the underside of the front end of the body, a steering wheel pivoted horizontally in each yoke, a transverse connecting bar connecting said yokes, a transverse steering bar pivoted vertically on the upper side of the front part of the body, and a longitudinal coupling arm rigidly secured at its front end to the center of the steering bar and at right angles thereto while its rear end is pivotally connected with the center of said connecting bar.

2. A wheeled coaster comprising a body having two side bars, a seat connecting the rear parts of the side bars and a cross piece connecting the front parts of the side bars, a pair of supporting wheels mounted on the underside of said seat, a pair of yokes pivoted vertically underneath the front cross piece adjacent to the opposite sides thereof, steering wheels pivoted horizontally in said yokes, respectively, a transverse connecting bar arranged adjacent to the rear edge of the front cross piece and pivoted vertically at opposite ends to said yokes, a transverse steering bar pivoted vertically at its center to the top of said cross piece, and a longitudinal coupling arm secured at its front end to the center of the steering bar while its rear end is depressed and pivoted vertically to the center of said connecting bar.

Witness my hand this 25th day of February, 1909.

CHARLES D. ORCUTT.

Witnesses:
 THEO. L. POPP,
 JOHN J. SCHNEIDER.